United States Patent
Huynh

(10) Patent No.: US 11,484,160 B1
(45) Date of Patent: Nov. 1, 2022

(54) SOAP CONTAINER

(71) Applicant: Nhut Huynh, Savannah, GA (US)

(72) Inventor: Nhut Huynh, Savannah, GA (US)

( * ) Notice: Subject to any disclaimer, the term of this patent is extended or adjusted under 35 U.S.C. 154(b) by 233 days.

(21) Appl. No.: 17/027,210

(22) Filed: Sep. 21, 2020

(51) Int. Cl.
*A47B 88/40* (2017.01)
*A47K 5/12* (2006.01)
*A47L 17/00* (2006.01)

(52) U.S. Cl.
CPC .......... *A47K 5/1208* (2013.01); *A47B 88/402* (2017.01); *A47L 17/00* (2013.01)

(58) Field of Classification Search
CPC ..... A47L 17/00; A47B 88/402; A47K 5/1208; B65D 21/0233; B65D 21/0201; B65D 1/34; Y10S 220/909
See application file for complete search history.

(56) References Cited

U.S. PATENT DOCUMENTS

| | | | | |
|---|---|---|---|---|
| 5,447,256 A | * | 9/1995 | Graham | B67D 1/16 141/357 |
| 6,279,188 B1 | * | 8/2001 | Barwin | B05B 11/0005 401/125 |
| 8,002,146 B2 | * | 8/2011 | Cahen | A47J 31/4482 222/173 |
| 10,322,427 B2 | | 6/2019 | O'Brien | |
| 11,267,685 B2 | * | 3/2022 | Zielonka | B67D 1/0406 |
| 2012/0305595 A1 | * | 12/2012 | Braun | B67D 3/0067 222/105 |
| 2016/0137345 A1 | | 5/2016 | Grodsky | |

FOREIGN PATENT DOCUMENTS

| CN | 201481251 | * | 5/2010 |
|---|---|---|---|
| CN | 201564377 | * | 9/2010 |
| CN | 202163687 | * | 3/2012 |
| CN | 203211653 | * | 9/2013 |

\* cited by examiner

*Primary Examiner* — Frederick C Nicolas
*Assistant Examiner* — Randall A Gruby
(74) *Attorney, Agent, or Firm* — Sanchelima & Associates, P.A.; Christian Sanchelima; Jesus Sanchelima

(57) ABSTRACT

A system for a soap container including a container assembly and a drawer assembly is disclosed. The container assembly includes a container. The container houses and maintains a sponge member and a soap solution readily available to a user for cleaning of a desired surface. The container includes a reservoir at a top portion. The reservoir has an open top face and is refilled through the top face once the soap solution is depleted. The reservoir is selectively sealed with a tray. A nozzle is attached to the reservoir to dispense the soap solution within. The drawer is removably secured to a slot at a lower portion of the container. The sponge member is removably secured within the drawer, such that when the drawer is opened, the sponge member is underneath of the nozzle, which is actuated to dispense the soap solution onto the sponge member.

15 Claims, 4 Drawing Sheets

SOAP CONTAINER

BACKGROUND OF THE INVENTION

1. Field of the Invention

The present invention relates to a soap container, more particularly, to a soap container having multiple compartments for aiding a user in storing and dispensing soap.

2. Description of the Related Art

Several designs for soap containers have been designed in the past. None of them, however, include a soap container that is refillable and includes multiple compartments for storage of liquid soap to be dispensed and additional cleaning items such as a sponge member.

Applicant believes that a related reference corresponds to U.S. patent publication No. 2016/0137345 for stackable systems. Applicant believes that another related reference refers to U.S. Pat. No. 10,322,427 for a cleaning fluid dispenser. None of these references, however, teach of refillable soap container having multiple storage compartments.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a soap container that aids in dispensing liquid soap for cleaning.

It is another object of this invention to provide a soap container that is refillable and reusable.

It is still another object of the present invention to provide a soap container that provides storage for liquid soap and additional cleaning items.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
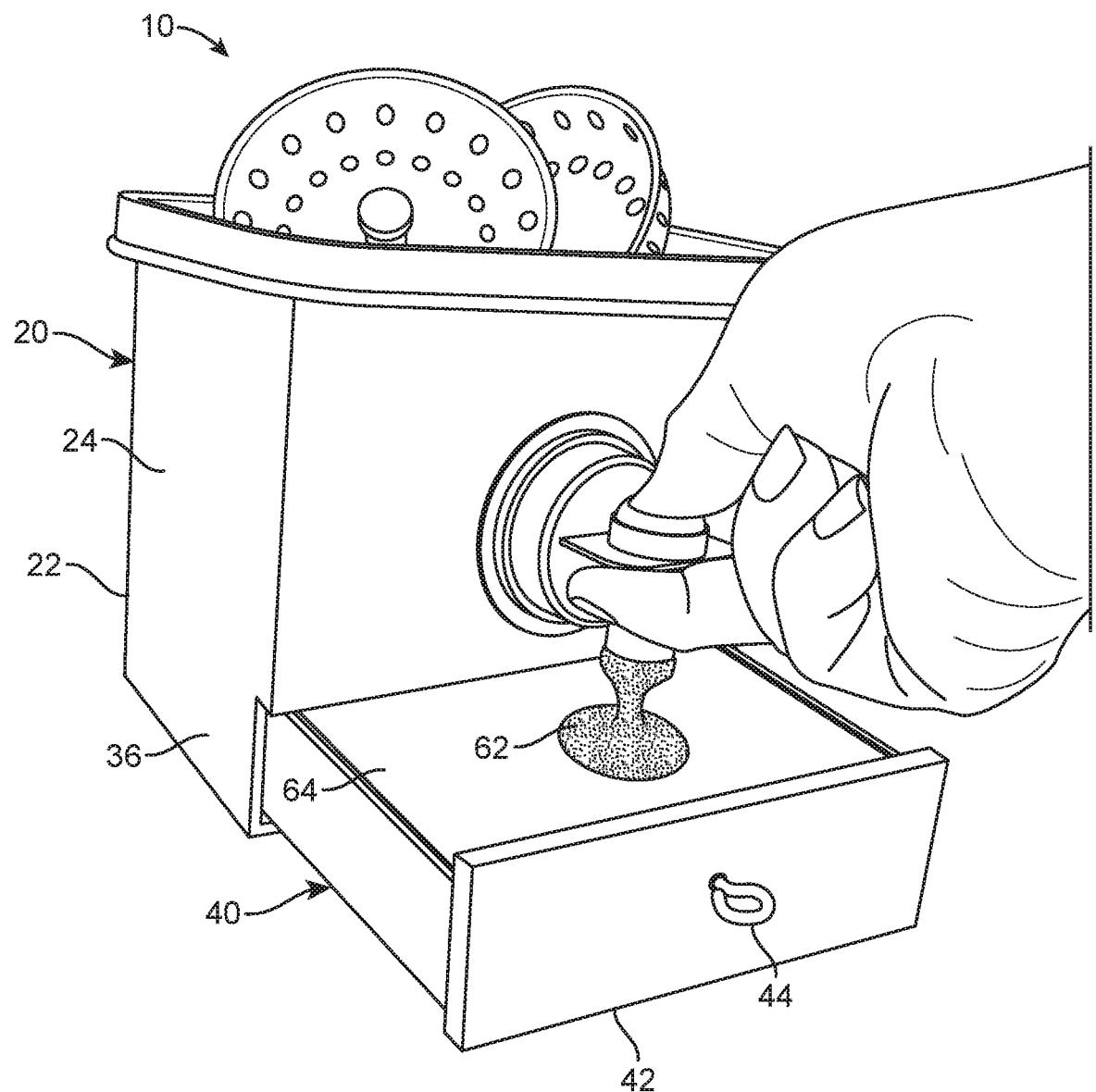
FIG. 1 represents an operational view of the soap container 10.
Figure 2:
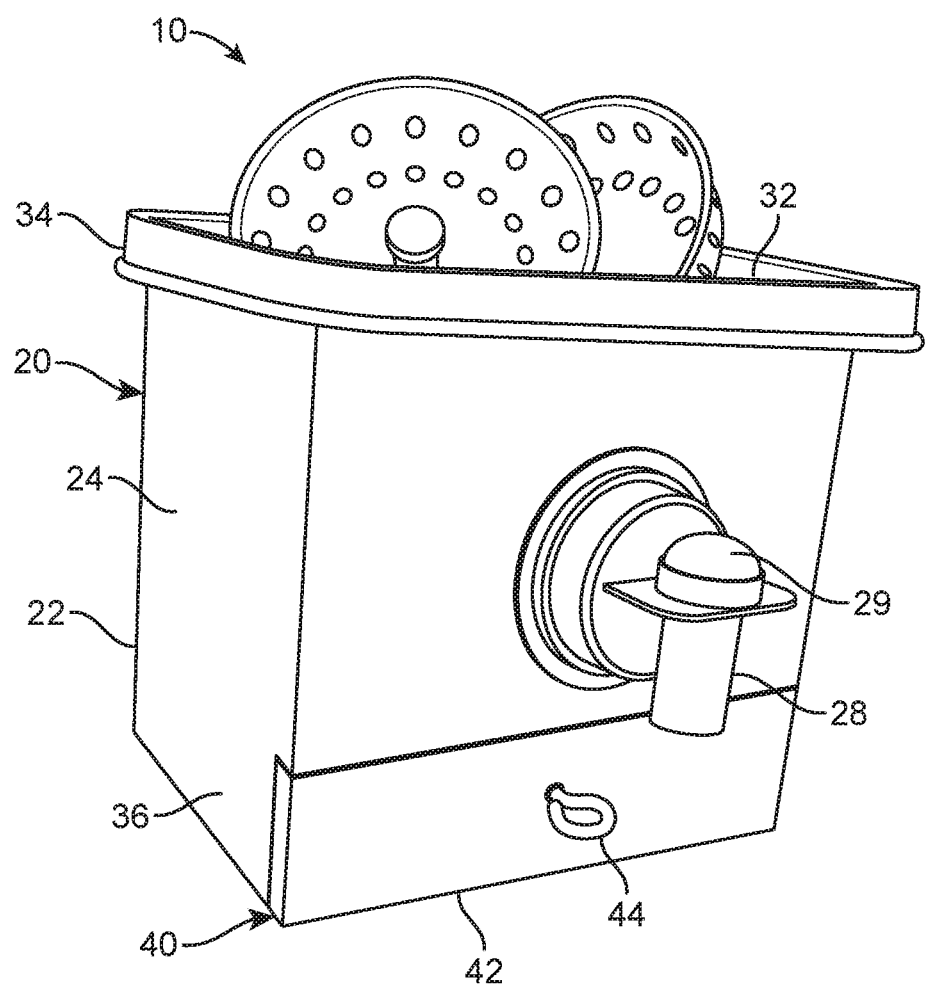
FIG. 2 shows an isometric view of soap container 10 with drawer 42 in a closed configuration.
Figure 3:
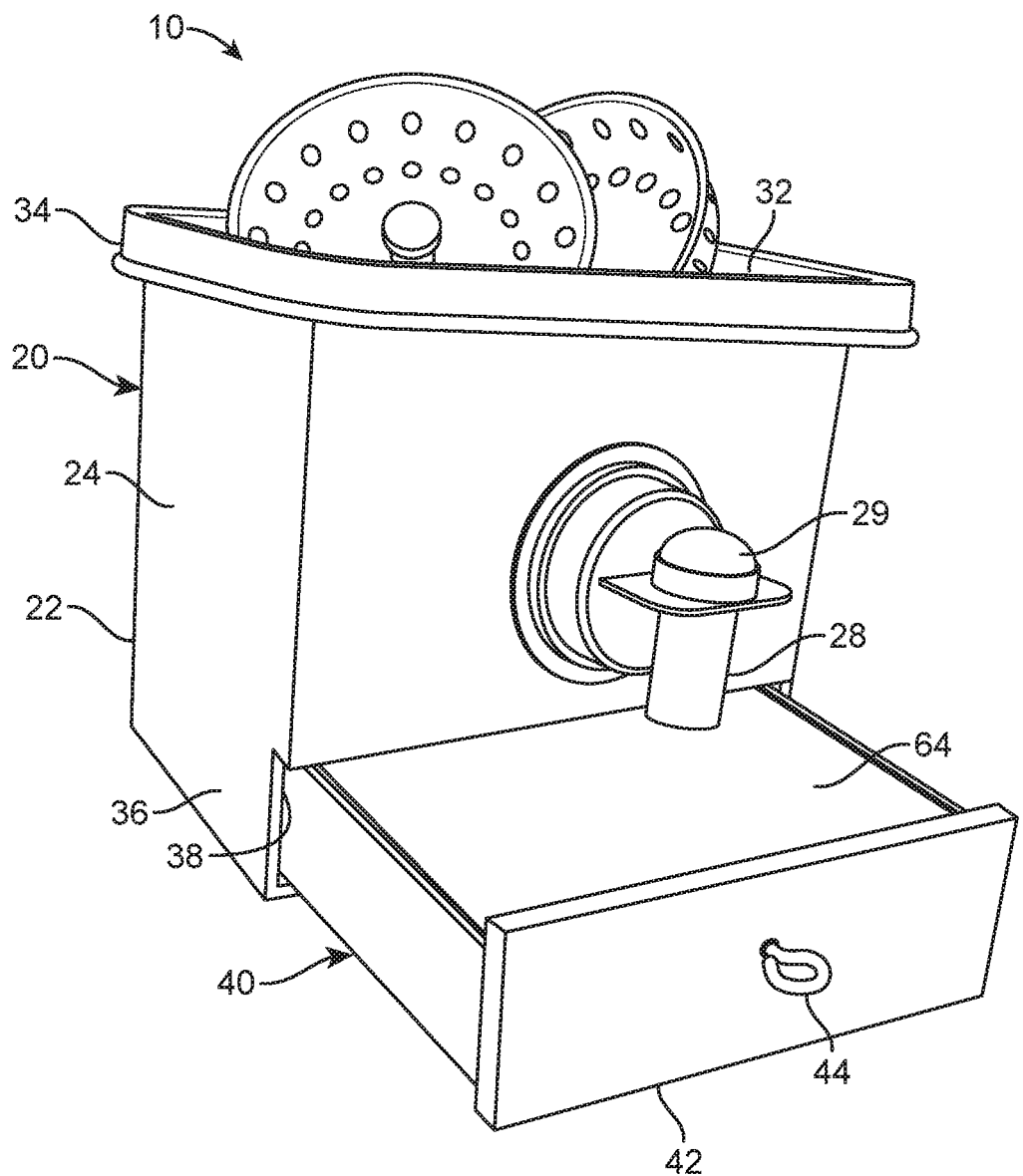
FIG. 3 illustrates an isometric view of soap container 10 with drawer 42 in an open configuration.
Figure 4:
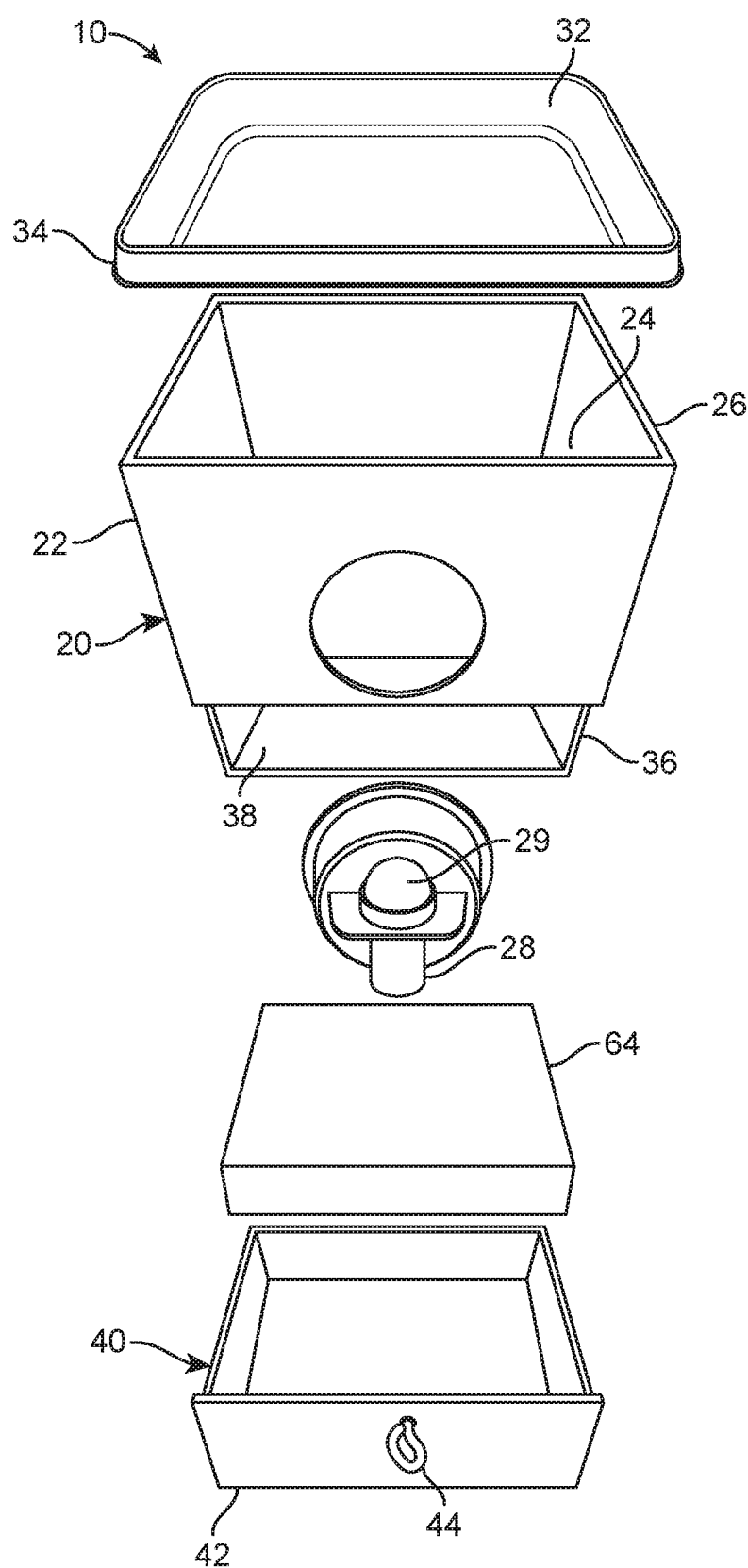
FIG. 4 is a representation of an exploded view of soap container 10.

Referring now to the drawings, where the present invention is generally referred to with numeral 10, it can be observed that it, a soap dispenser 10, basically includes container assembly 20 and a drawer assembly 40.

Soap dispenser 10 may help to keep cleaning supplies more organized and safely stored on a countertop or the like. Soap dispenser 10 aids in maintaining all supplies readily available to a user for more efficient cleaning. It is to be understood that soap dispenser 10 may be reusable and refillable with liquid soap. Soap dispenser 10 may facilitate the dispensing of a soap solution 62 onto a sponge member 64.

Container assembly 20 may include container 22. Container 22 may be used to maintain cleaning supplies organized and stored. It is to be understood that container 22 may be of a rectangular vertical extending shape. It is to be understood that container 22 may have a height greater than width and length. Container 22 may be compact allowing for container 22 to be easily positioned even in crowded spaces. Container 22 may be substantially hollow, in the preferred embodiment. Container 22 may be made of materials such as plastic, metal, rubber, aluminum, wood or combinations thereof.

Container 22 may include a reservoir 24 located at a top portion of container 22. Reservoir 24 may extend a partial but substantial height of container 22. It may be suitable for reservoir 24 to extend ¾ of the height of container 22, in the preferred embodiment. Reservoir 24 may be hollow to allow receiving of soap solution 62 within. It is to be understood that soap solution 62 may be selectively dispensed from reservoir 24 when needed. Reservoir 24 may include a top end 26. Top end 26 may be entirely open and define a top face of reservoir 24. Reservoir 24 may be refilled with soap solution 62 through top end 26 as top end 26 leads to an interior of reservoir 24. It is to be understood that soap solution 62 may be any desired cleaning agent of the user.

Attached to an exterior of reservoir 24 may be a nozzle 28. In the preferred embodiment, nozzle 28 may be attach to the front of reservoir 24. Nozzle 28 may be parallel to reservoir 24, in the preferred implementation. Nozzle 28 may extend vertically a partial height of container 22. It is to be understood that nozzle 28 may be secured to reservoir with an attaching member. In one embodiment, the attaching member may be circular. The attaching member may protrude outwardly and away from reservoir 24. The attaching member may be substantially hollow to guide soap solution 62 from within reservoir 24 towards nozzle 28 for dispensing. Attached to nozzle 28 may be a pump 29. Pump 29 may preferably be secured atop of nozzle 28. Pump 29 may be actuated to dispense soap solution 62 from reservoir 24 through nozzle 28. Pump 29 may be dome shape, in one embodiment. Pump 29 may extend outwardly and away from nozzle 28. Attached to perpendicularly to nozzle 28 may be grip members which facilitate actuation of pump 29. The grip members may extend outwardly and away from nozzle 28. The grip members may each receive the fingers of the user underneath while the user engages pump 29 with their thumb, for example.

Removably attached to reservoir 24 may be a tray 32. More specifically, tray 32 may be secured to top end 26 to selectively cover reservoir 24. Tray 32 may alternatively be referred to as a lid or cover. Tray 32 may be partially recessed within reservoir 24. Tray 32 may serve as a shelf to store cleaning supplies, items such as drain covers or additional of sponge member 64 thereon. Tray 32 may hold items such as drain covers, bristles or other supplies necessary for cleaning. Tray 32 may include a lip 34 extending an entire perimeter thereof. Lip 34 may extend downwardly from tray 32. Lip 34 may engage the perimeter of reservoir 24 along top end 26 to secure tray 32 thereto. Lip 34 may extend partially along the height of container 22 when tray 32 is secured to container 22. Lip 34 may further facilitate the attachment and removal of tray 32 from container 22. It is to be understood that tray 32 may have a length greater than container 22 due to lip 34.

Container 22 may further include a bottom portion 36 located beneath of reservoir 24. It is to be understood that bottom portion 36 may be in constant abutting contact with reservoir 24. Bottom portion 36 may include a slot 38. Slot 38 may be adjacent to and in abutting contact with reservoir. Importantly, slot 38 may be entirely below nozzle 28. Slot 38 may be recessed within container 22. Slot 38 may extend an entire length of container 22. It is to be understood that slot 38 may be used to house drawer assembly 40 within.

Drawer assembly 40 may be received within container 22 through slot 38. Drawer assembly 40 may include a drawer 42 which may be removably secured within slot 38. Drawer 42 may have an open and closed configuration. It is to be understood that drawer 42 may slide in and out of slot 38 to achieve the open and closed configuration. Drawer 42 may include a handle 44. Handle 44 may facilitate the opening and closing of drawer 42 to achieve the open and closed configuration, respectively. Handle 44 may be perpendicular to drawer 42. Handle 44 may extend outwardly and away from drawer 42. In the preferred embodiment, handle 44 may be in a ring configuration. Drawer 42 may house sponge member 64 within. During storage sponge member 64 may be concealed when drawer 42 is in the closed configuration. When drawer 42 is in the open configuration, sponge member 64 may be revealed. In the open configuration, sponge member 64 may be directly underneath of nozzle 28. Such that when pump 29 is actuated, nozzle 28 may dispense soap solution 62 onto sponge member 64 below. Subsequently, sponge member 64 may be retrieved from drawer 42 to be used for cleaning.

Soap container 10 may assist users in maintaining their countertops organized and neat looking. Soap container 10, importantly, maintains soap solution 62 and sponge member 64 readily available. Allowing the user to be more efficient and effective when cleaning a surface with sponge member 64.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system, comprising:
   a) a container assembly including a container, said container including a reservoir housing a soap solution within, said reservoir including a nozzle in fluid attachment to said reservoir, said nozzle secured to an exterior of said container, said container further including a slot at a bottom portion thereof, said nozzle includes a pump attached atop thereof, a tray removably attached to said reservoir with a lip, said tray selectively covering said reservoir, said reservoir includes an open top face at a top end of said reservoir, said reservoir refillable with additional of said soap solution through said open top face, said tray being partially recessed within said reservoir, said tray supporting supplies thereon;
   b) a drawer assembly including a drawer slidably secured within said slot, said drawer having an open configuration and a closed configuration;
   c) a sponge member removably secured within said drawer, said sponge member being entirely concealed in the closed configuration, said sponge member being exposed in the open configuration, said soap solution selectively dispensed onto said sponge member through said nozzle when said drawer is in the open configuration, said pump being actuated to dispense said soap solution through said nozzle.

2. The system of claim 1, wherein said container is hollow.

3. The system of claim 1, wherein the tray is secured to said top end to selectively cover said reservoir and said open top face.

4. The system of claim 3, wherein said lip extends about an entire perimeter of said tray.

5. The system of claim 4, wherein said lip extends downwardly from said tray, said tray entirely concealing said top end.

6. The system of claim 1, wherein said nozzle and said pump are parallel to said container.

7. The system of claim 1, wherein a height of the reservoir is greater than a height of the slot.

8. The system of claim 1, wherein said drawer is entirely underneath of said nozzle.

9. The system of claim 1, wherein said slot and said reservoir are adjacent to each other and in constant abutting contact.

10. The system of claim 1, wherein said slot extends an entire length of said container.

11. The system of claim 10, wherein said handle is in a ring configuration.

12. The system of claim 1, wherein said drawer includes a handle attached thereto, said handle facilitating achieving of the open configuration and the closed configuration.

13. The system of claim 1, wherein said drawer is entirely removable from said slot.

14. The system of claim 1, wherein said tray has a width greater than said container.

15. A system, comprising:
   a) a container assembly including a container, said container being hollow, said container including a reservoir at a top portion of said container, said reservoir having an open top face, said reservoir housing a soap solution within, said reservoir including a nozzle in fluid attachment with said reservoir, said nozzle secured to an exterior of said container, said nozzle having a pump attached thereto, said pump being atop of said nozzle and extending outwardly from said nozzle, said container further including a slot at a bottom portion thereof, said slot extending a length of said container, said slot being entirely underneath of said reservoir, said slot and said reservoir being adjacent to each other, a tray removably attached to said reservoir with a lip, said tray selectively covering said reservoir, said reservoir refilled with additional of said soap solution through said open top face, said tray being partially recessed within said reservoir, said tray supporting supplies thereon;
   b) a drawer assembly including a drawer slidably secured within said slot, said drawer having an open configuration and a closed configuration, said drawer including a handle attached thereto, said handle being in a ring configuration;
   c) a sponge member removably secured within said drawer, said sponge member being entirely concealed in the closed configuration, said sponge member being exposed in the open configuration, said soap solution selectively dispensed onto said sponge member through said nozzle when said pump is actuated and said drawer is in the open configuration.

\* \* \* \* \*